United States Patent
Randall

(10) Patent No.: US 8,011,330 B2
(45) Date of Patent: Sep. 6, 2011

(54) SYSTEMS AND METHODS FOR ENGINE EMISSIONS REDUCTION ON SHIPS

(75) Inventor: Peter Randall, Davie, FL (US)

(73) Assignee: Peter Randall, Davie, FL (US)

( * ) Notice: Subject to any disclaimer, the term of this patent is extended or adjusted under 35 U.S.C. 154(b) by 736 days.

(21) Appl. No.: 12/130,417

(22) Filed: May 30, 2008

(65) Prior Publication Data

US 2008/0295797 A1 Dec. 4, 2008

Related U.S. Application Data

(60) Provisional application No. 60/924,743, filed on May 30, 2007.

(51) Int. Cl.
*F02B 47/02* (2006.01)
*F02M 25/00* (2006.01)
*B01D 37/00* (2006.01)
*B01D 33/00* (2006.01)
*B01D 15/00* (2006.01)
*B01D 35/00* (2006.01)
*B01D 63/00* (2006.01)
*C02F 1/50* (2006.01)
*C02F 3/12* (2006.01)
*C02F 1/00* (2006.01)
*C02F 9/00* (2006.01)
*B01D 24/00* (2006.01)
*B01D 17/12* (2006.01)

(52) U.S. Cl. ............ 123/25 A; 123/25 G; 210/767; 210/502.1; 210/805; 210/806; 210/195.1; 210/196; 210/202; 210/203; 210/205; 210/206; 210/257.1; 210/257.2; 210/258; 210/416.1

(58) Field of Classification Search ........... 123/25 A, 123/25 G–25 Q; 210/195.1, 196, 202, 203, 210/205, 206, 257.1, 257.2, 258, 416.1, 502.1, 767, 805, 806

See application file for complete search history.

(56) References Cited

U.S. PATENT DOCUMENTS

| | | | | |
|---|---|---|---|---|
| 5,542,379 | A * | 8/1996 | Kessler | 123/25 C |
| 5,718,194 | A * | 2/1998 | Binion | 123/25 C |
| 6,289,853 | B1 * | 9/2001 | Walczak et al. | 123/25 R |
| 6,361,695 | B1 | 3/2002 | Husain et al. | |
| 7,108,782 | B1 | 9/2006 | Higgins et al. | |
| 7,661,378 | B2 * | 2/2010 | Randall | 114/125 |
| 2004/0099608 | A1 * | 5/2004 | Leffler et al. | 210/704 |
| 2005/0126513 | A1 | 6/2005 | Hendren | |
| 2007/0114182 | A1 | 5/2007 | DePoli et al. | |
| 2008/0178581 | A1 * | 7/2008 | Nishimoto et al. | 60/297 |

OTHER PUBLICATIONS

Press Release: Recycled Water (May 8, 2008) http://sustainca.org/newsroom/recycled_water_news.*
Emission reduction systems for ships http://www.nauticexpo.com/boat-manufacturer/emission-reduction-systems-for-ships-1429.*

* cited by examiner

Primary Examiner — Devon C Kramer
Assistant Examiner — Tea Bajramovic
(74) Attorney, Agent, or Firm — Sheppard, Mullin, Richter & Hampton LLP; Don J. Pelto

(57) ABSTRACT

The present invention relates to the reduction of harmful exhaust emissions on ships using diesel engines equipped with a wet emissions reduction system. In particular, the invention relates to a large diesel internal combustion engines installed on a ship and fitted with a wet emissions reductions system that is supplied water by an onboard advanced wastewater treatment system (AWTS).

14 Claims, 2 Drawing Sheets

SYSTEMS AND METHODS FOR ENGINE EMISSIONS REDUCTION ON SHIPS

CROSS REFERENCE TO RELATED APPLICATIONS

This application claims the benefit, under 35 U.S.C. §119, of provisional U.S. Application Ser. No. 60/924,743, filed May 30, 2007, the entire contents and substance of which is hereby incorporated by reference.

FIELD OF THE INVENTION

The present invention relates to the reduction of emissions on ships using internal combustion engines, and specifically diesel engines, equipped with wet emission reduction systems. In particular, the invention relates to a large diesel internal combustion engines installed on a ship and fitted with a wet emissions reduction system. Wastewater is supplied to the system by an onboard advanced wastewater treatment system (AWTS) and is introduced by the wet emissions reduction system into the combustion chambers of the diesel engine to lower undesirable emissions, especially oxides of nitrogen (NOx), and to some extent, particulate matter (PM), or soot.

BACKGROUND OF THE INVENTION

Large commercial and military vessels are faced with meeting increasingly-strict engine exhaust emissions standards. Applicable regulatory standards include the Marine Pollution (MARPOL) Annex VI and United States Environmental Protection Agency (USEPA) Tier 1-3, MARPOL, also known as the Ship Pollution Protocol, regulates various aspects of solid, liquid, and atmospheric pollution by ships. 33 U.S.C. §§1901 et seq, (2000). MARPOL Annex VI addresses atmospheric pollution. Applicable EPA regulations generally limit exhaust emissions of NOx, PM, carbon monoxide, and unburned hydrocarbons (HC). See 40 C.F.R. § 94 (1999). The use of a wet emissions reduction system reduces the amount of NOx, and in some cases, the amount of PM created by an internal combustion engine.

Large commercial and military vessels use large diesel engines for power. Diesel engines are governed, not throttled like gasoline engines. A diesel engine does not have a throttle plate like a gasoline engine, which restricts the intake of air, so the cylinders are completely filled with fresh air on each intake stroke. This means that rather than controlling the amount of both air and fuel available to the engine, the engine's output is regulated exclusively by the amount of fuel that is injected into the engine cylinder. Therefore, diesel engines run at a wide variety of fuel/air ratios from very lean (approximately 60-100:1) at idle to only slightly lean at full power (approximately 18:1). For a number of reasons, when running rich or even close to stoichiometric, diesel engines tend to produce an undesirable amount of smoke in the exhaust due to unburned fuel.

Running the engine lean to optimize efficiency and minimize smoke however, produces a different, and undesirable, effect. At standard conditions, nitrogen is a fairly inert diatomic gas. However, at the very high temperatures found in a diesel engine combustion chamber, the excess thermal energy breaks apart both diatomic nitrogen and diatomic oxygen. As a result, because there is not enough fuel to consume all of the oxygen in a given charge due to the lean air/fuel ratio, the remaining oxygen combines with the (now unstable) nitrogen atoms to form NOx, one of the targets of emissions regulations.

However, the use of a wet emissions reduction system in an internal combustion engine lowers the temperature in the combustion chamber. The conversion of the injected water into steam absorbs the residual heat in the combustion chamber from the previous combustion event and lowers the ultimate temperature of the current combustion event. This reduction in temperature reduces the amount of thermal energy available in the combustion chamber and thus reduces the formation of NOx. The injected water molecules may also provide a greater surface area for fuel molecules to cling to, allowing for more homogenous dispersion and combustion throughout, the combustion chamber. This results in a more complete combustion event and may decrease the amount of particulate matter exhausted into the atmosphere.

The use of a wet emission reduction system also reduces the possibility of pre-detonation. Pre-detonation occurs when the residual heat in the combustion chamber, coupled with rising pressure in the combustion chamber as the piston approaches top dead center (TDC), causes the fuel to ignite explosively and prematurely (ideal combustion event timing being somewhere just before or just after TDC depending on conditions). While the problem is most associated with gasoline engines, pre-detonation does occur in diesel engines as well. Pre-detonation is generally the source of the distinctive "knocking" sound associated with large diesel engines at idle (when diesels are running at their leanest settings).

Pre-detonation also results in the formation of NOx. Pre-detonation causes an explosive ignition of the fuel/air mixture rather than a controlled burn. This creates very high local combustion pressures and temperatures, which promote the formation of NOx for the same reasons outlined above. Pre-detonation also causes incomplete combustion in other local areas as the explosion "blows out" the flame front. This prevents the flame front from propagating through the combustion chamber in the manner necessary for complete combustion. The resulting incomplete combustion leads to HC, another subject of emissions regulations, which are then exhausted into the atmosphere. Pre-detonation also results in reduced efficiency of the diesel engine while under load because of the effects described above.

The "x" in NOx indicates that at these high temperatures and energy levels there are several unstable compounds that can be formed with varying numbers of oxygen atoms. These molecules are unstable, however, and can only form due to the abundance of energy available. This instability results in compounds that are very reactive and thus damaging to the environment, people, and animals. Many oxides of nitrogen are colorless and odorless; however, nitrogen dioxide is a major component in the reddish-brown layer of air over many urban centers. NOx is also a major contributor to ground level ozone, acid rain, and global warming.

The wet emissions reductions systems referred to above can be any of several types currently in use and under development. The systems include, but are not limited to, an intake manifold water injection system, a water/fuel emulsion system, or a direct water injection system. Running internal combustion engines with any of these wet emissions reduction systems has several benefits in addition to reduced emissions. First, the increased humidity in the combustion chamber may have a lubricating effect, thus lowering wear on the cylinder walls and piston rings. Second, lowering combustion temperatures reduces the overall thermal stress on the engine as well as minimizing localized "hot spots." Third, the conversion of water to steam in the combustion chamber tends to remove carbon deposits and prevent their further formation both in the combustion chamber and throughout the exhaust system of the diesel engine. Reduction in carbon deposits can, in turn, reduce required maintenance, extend lubricating oil life, and make turbochargers and economizers more efficient.

Wet emissions reduction systems, however, require large amounts of water to obtain optimum results. Indeed, the amount of water needed for optimum effect may exceed 20% of the fuel requirement. One available source of abundant water aboard large passenger vessels, especially modern cruise ships, ferries, and, potentially, large naval vessels, in adequate quantities for consideration for use with these emission reduction technologies is AWTS clean effluent. In these systems, vessel black water and/or grey water is treated and purified to a high grade of purity that typically meets or exceeds the standards found in 33 C.F.R. §159 (e) (1999). These systems typically employ tertiary (or higher) waste water treatment technologies.

AWTS clean effluent commonly needs removal of some chemical and solid content, specifically nutrients, phosphorous, ammonia, and suspended solids, to meet purify requirements for engine applications. On vessels with property functioning AWTS, AWTS clean effluent is generally plentiful. In these cases, the water is recycled by the present invention and therefore has little associated direct cost, because it would otherwise have been disposed of after treatment by the AWTS. Additionally, recycling the water potentially relieves vessel effluent disposal problems and reduces treated wastewater discharges to the environment. As a result, the AWTS is used to reduce both water pollution discharges and air pollution discharges.

The AWTS effluent is further purified and filtered by the present invention for use in a wet emissions reduction system. The novel use of AWTS effluent in the methods and systems of the present invention assists ship owners and operators in meeting USEPA and MARPOL emissions requirements. Additionally, the systems and methods of the present invention reduce the maintenance and increase the longevity of the vessel's engines as well as providing an alternate means of disposal for the AWTS clean effluent.

SUMMARY OF THE INVENTION

In one embodiment of the present invention, the invention comprises a system comprising an AWTS clean effluent tank, a primary sensor, primary pump, and primary control system, an additional filtration system, a secondary sensor, secondary pump, and secondary control system, a wet emissions technology reserve tank, and a tertiary sensor, tertiary pump, and tertiary control system, where said system is adapted to be connected to a wet emissions reduction system on one or more diesel engines on a ship, where said AWTS clean effluent tank is connected via pipes that carry AWTS clean effluent from said AWTS clean effluent tank to said primary sensor, primary pump, and primary control system, where said primary sensor, primary pump, and primary control system is connected via pipes that carry AWTS clean effluent from the primary sensor, primary pump, and primary control system to said additional filtration system, where said primary sensor, primary pump, and primary control system is connected via pipes that carry AWTS clean effluent from the primary sensor, primary pump, and primary control system to said wet emissions technology reserve tank, where said, additional filtration system is connected via pipes that carry filtered AWTS clean effluent from said additional filtration system to said secondary sensor, secondary pump, and secondary control system, where said secondary sensor, secondary pump, and secondary control system is connected via pipes that carry filtered AWTS clean effluent from said secondary sensor, secondary pump, and secondary control system to said wet emissions technology reserve tank, where said secondary sensor, secondary pump, and secondary control system is also connected via pipes that carry rejected/recirculated filtered AWTS clean effluent from said secondary sensor, secondary pump, and secondary control system to said primary sensor, primary pump, and primary control system, where said secondary sensor, secondary pump, and secondary control system is also connected via pipes that carry rejected/recirculated filtered AWTS clean effluent from said secondary sensor, secondary pump, and secondary control system to said additional filtration system, where said wet emissions technology reserve tank is connected via pipes that carry filtered AWTS clean effluent from said wet emissions technology reserve tank to said tertiary sensor, tertiary pump, and tertiary control system, and where said tertiary sensor, tertiary pump, and tertiary control system is connected via pipes that carry filtered AWTS clean effluent from said tertiary sensor, tertiary pump, and tertiary control system to said wet emissions reduction system.

In an additional embodiment said additional filtration system comprises one or more filtration systems selected from the group consisting of filters, membranes, precipitants, pH adjusters, and electrolytic converters. In yet another aspect, in said additional filtration system the filters may comprise one or more filtration media selected from the group consisting of: charcoal, sand, clay, polymer, and paper. In another embodiment, the additional filtration system further comprises membranes, where said membranes may comprise one or more membrane materials selected from the group consisting of stainless steel, polymer, and ceramic.

In an additional aspect, the additional filtration system may comprise one or more precipitant systems selected from the group consisting of electrolytic precipitants and chemical precipitants. In yet another embodiment, the present invention includes a method for filtering AWTS clean effluent for use in a wet emissions reduction system for use with a diesel engine on a ship comprising the steps of carrying said AWTS clean effluent from an AWTS clean effluent tank to a primary sensor, primary pump, and primary control system, testing said AWTS clean effluent with said primary sensor, primary pump, and primary control unit, and if said AWTS clean effluent meets the necessary level of purity, carrying said AWTS clean effluent to a wet emissions reductions reserve tank, measuring the level of said AWTS clean effluent in said wet emissions reserve tank with a tertiary sensor, tertiary pump, and tertiary control system, and if the level of said AWTS clean effluent is sufficient, carrying said AWTS clean effluent to a wet emissions reduction system for use in said diesel engine.

In a further aspect, the present invention includes a method for filtering AWTS clean effluent for use in a wet emissions reduction system for use with a diesel engine on a ship comprising the steps of carrying said AWTS clean effluent from a AWTS clean effluent tank to a primary sensor, primary pump, and primary control system, testing said AWTS clean effluent with said primary sensor, primary pump, and primary control unit, and if said AWTS clean effluent does not meet the necessary level of purity, carrying said AWTS clean effluent through an additional filtration system to have specific chemical and solid content adjusted, carrying the AWTS clean effluent from said additional filtration system to a secondary sensor, secondary pump, and secondary control system, testing said AWTS clean effluent with said secondary sensor, secondary pump, and secondary control system, and if said AWTS clean effluent meets the necessary level of purity for use in a wet emissions reserve system, carrying filtered AWTS clean effluent from said secondary sensor, secondary pump, and secondary control system to a wet emissions technology reserve tank, measuring the level of said filtered AWTS clean effluent in said wet emissions reserve tank, with a tertiary sensor, tertiary pump, and tertiary control system, and if the level of said filtered. AWTS clean effluent is sufficient, carrying said filtered AWTS clean effluent to said wet emissions reduction system for use in said diesel engine.

In yet another embodiment, the present invention includes a method in which if said AWTS clean effluent does not meet the level of purity required for said, wet emissions reduction system, recycled/recirculated filtered AWTS clean effluent is carried back to said primary sensor primary pump and primary control system. In an additional aspect, the present invention includes a method in which if said AWTS clean effluent does not meet the level of purity required for said wet emissions reduction system, recycled/recirculated filtered AWTS clean effluent is carried back to said additional filtration system The present invention additionally includes a method comprising lowering the combustion temperature of said diesel engine on said ship by introducing said filtered AWTS clean effluent into the cylinder of said diesel engine. Another aspect of the present invention is a method comprising reducing the emissions of particulate matter of said diesel engine on said ship by introducing said filtered AWTS clean effluent into the cylinder of said diesel engine. An additional aspect of the present invention is the lowering of combustion temperatures to reduce the formation and emission of oxides of nitrogen. Yet another embodiment of the present invention introduces filtered AWTS clean effluent into said cylinder said diesel engine via a water injection system that injects said filtered AWTS clean effluent into the intake manifold of said diesel engine. In still another aspect, filtered AWTS clean effluent is introduced into the cylinder said diesel engine via a water injection system that injects said filtered AWTS clean effluent directly into the cylinder of said diesel engine.

An addition aspect of the present invention filtered AWTS clean effluent is introduced into the cylinder said diesel engine by mixing said filtered AWTS clean effluent with diesel fuel in a fuel/water emulsion system. In another embodiment, filtered AWTS clean effluent is introduced into the cylinder said diesel engine via a water injection system that injects said filtered AWTS clean effluent into the intake manifold of said diesel engine. In yet another aspect, filtered AWTS clean effluent is introduced into the cylinder said diesel engine via a water injection system that injects said filtered AWTS clean effluent directly into the cylinder of said diesel engine. In an additional aspect, filtered AWTS clean effluent is introduced into the cylinder said diesel engine by mixing said filtered AWTS clean effluent with diesel fuel in a fuel/water emulsion system.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the embodiments and the equivalents thereof.

DETAILED DESCRIPTION OF THE PREFERRED EMBODIMENT

It is understood that the present invention is not limited to the particular methodologies, protocols, systems and methods, etc., described herein, as these may vary. It is also to be understood that the terminology used herein is used for describing particular embodiments only, and is not intended to limit the scope of the present invention. It must be noted that as used herein and in the appended claims, the singular forms "a," "an," and "the" include the plural reference unless the context clearly dictates otherwise. For instance, a reference to a sensor refers to one or more sensors and a reference to "a system." is a reference to one or more systems and includes equivalents thereof known to those skilled in the art and so forth.

Unless defined otherwise, all technical and scientific terms used herein have the same meanings as commonly understood by one of ordinary skill in the art to which this invention belongs. Specific methods, devices, systems and materials are described, although any methods and materials similar or equivalent to those described herein, can be used in the practice or testing of the present invention.

The present invention relates to systems and methods for using wastewater, especially Advanced Wastewater Treatment System ("AWTS") clean effluent, in a wet emissions reduction system for large marine diesel engines. More specifically, it relates to emissions systems and methods for using filtered AWTS clean effluent in a wet emissions reduction system associated with the vessel's diesel engines. For the purposes of this invention, wastewater is defined as the untreated water generated by onboard use. AWTS clean effluent, is defined as treated sewage that would normally be dumped overboard after treatment in an AWTS. Filtered AWTS clean effluent has had certain solid and chemical content removed and has had pH levels adjusted, if necessary, as detailed below.

Figure 1:
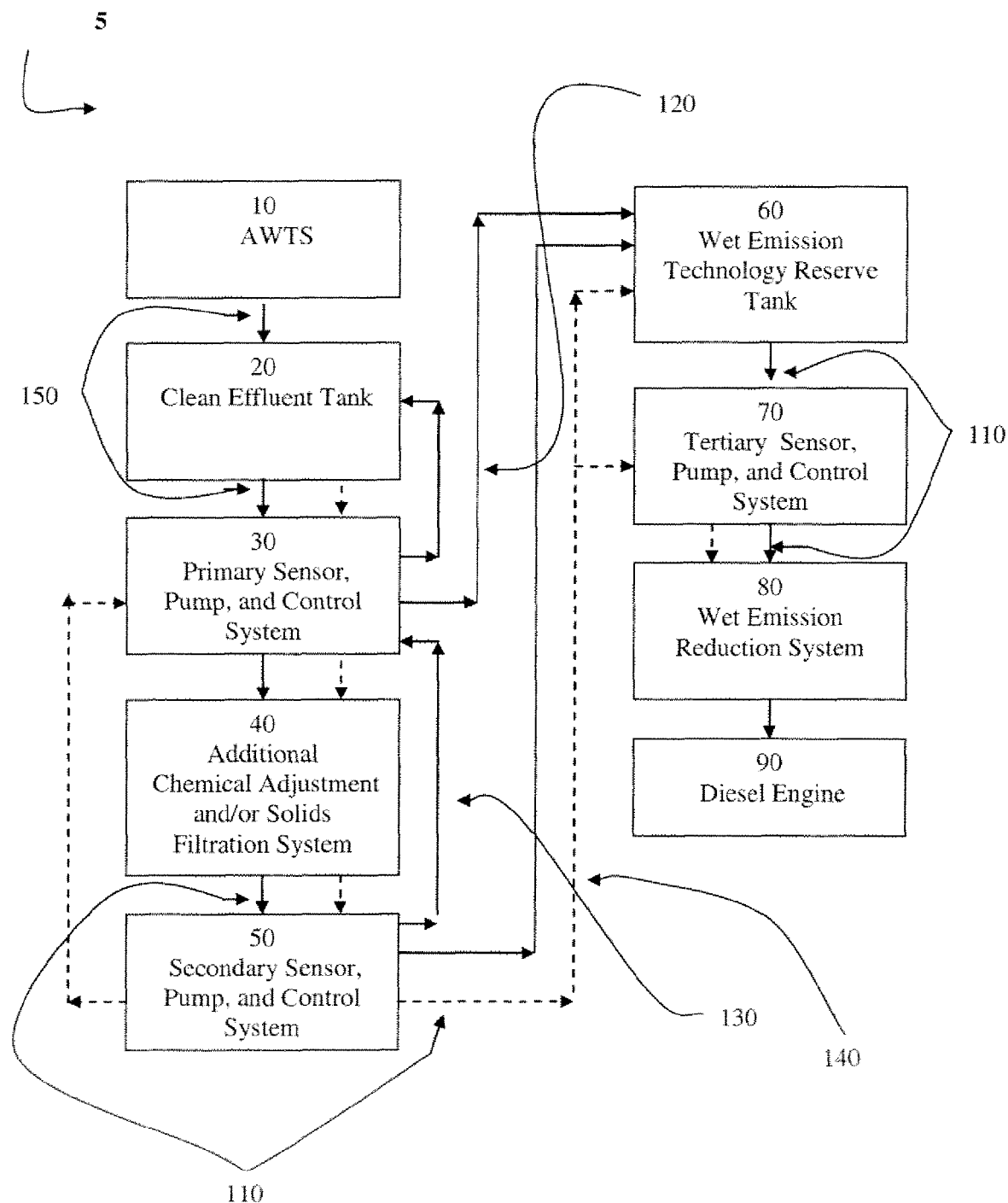
FIG. 1 is a block diagram of one specific embodiment of wastewater emissions reduction system 5.

As shown in FIG. 1, a wastewater emissions reduction system 5 according to one embodiment of the present invention comprises an AWTS 10, an AWTS clean effluent tank 20, primary sensor, primary pump, and primary control system 30, an additional filtration system 40, a secondary sensor, secondary pump, and secondary control system 50, a wet emissions technology reserve tank 60, a tertiary sensor, tertiary pump, and tertiary control system 70, and a wet emissions reduction system 80, AWTS clean effluent pipes 150, filtered AWTS clean effluent pipes 110, rejected/recirculated AWTS clean effluent pipes 120, rejected/recirculated filtered AWTS clean effluent pipes 130, and electronic cabling 140. This particular embodiment of the system is associated in use with a diesel engine 90.

The AWTS 10 includes any applicable or appropriate wastewater treatment system, e.g., the Scanship AWTS (Scanship Americas, Inc., Miami, Fla.), which treats wastewater generated aboard a vessel. The wastewater may include galley water, gray water, black water, and/or similar wastewater generated during the operation of the vessel. The wastewater may be generated by passengers or crew during the normal operation of the vessel. The wastewater may also be generated by the operations of the vessel itself, e.g., vessel maintenance or galley operations. The AWTS 10 progressively filters and treats the effluent until the treated clean effluent meets federal, state, and/or local environmental, health, and/or similar regulatory requirements for discharge in local or regional waters, e.g., 33 C.P.R. §159 (e) (1999).

When the AWTS clean effluent has reached the required level of purity for discharge, it would normally be pumped into the ocean, into ballast or holding tanks for later discharge, or ashore to a municipal treatment facility. However, in one aspect of the present invention the AWTS clean effluent is instead stored in the AWTS clean effluent tank 20. The present invention then further processes the water for use in a wet emissions reduction system 80.

The effluent is pumped from the AWTS clean effluent tank 20 via the AWTS clean effluent pipe 150 through the primary sensor, primary pump, and primary control system 30, where the primary sensor 30 measures, in a specific embodiment, the level of chemical impurities, suspended solids, and pH therein. The primary sensor, primary pump, and primary control system 30 may also measure tank levels, liquid flows, valve positions, equipment status, and other necessary parameters.

The impurities that need to be removed will vary depending on the manufacturer of the engine and the requirements of the particular wet emissions reduction system employed, as recognized by one skilled in the art. Normally chemicals such as phosphorous and ammonia must be removed for use in wet emissions reduction systems. Additionally, solids in suspension must be filtered out down to a given size to prevent fouling of the wet emissions reduction system 80 and the engine 90. The system may also measure and adjust the pH of the AWTS clean effluent.

If the primary sensor, primary pump, and primary control system detects that the purity or level of the AWTS clean effluent does not meet the necessary levels or quality, it may be recycled to the AWTS clean effluent tank 20 via the rejected/recirculated AWTS clean effluent pipe 120. If the purity of the AWTS clean effluent is such that it is ready for use in the wet emissions reduction system 80, the additional filtration system 40 and the secondary sensor, secondary pump, and secondary control system 50 is bypassed and the AWTS clean effluent is sent directly to the wet emissions technology reserve tank 60.

However, if additional purification is needed, the additional filtration system 40 adjusts the chemical levels, filters out additional chemicals and solids, and adjusts the pH of the AWTS clean effluent as necessary. The AWTS clean effluent may be filtered through charcoal, sand, or clay. The effluent may alternatively, or additionally, be passed through various types of filters, such as charcoal, polymer, and paper filters. The effluent may alternatively or additionally be passed through membrane materials of various pore sizes and made of various materials such as stainless steel, polymer, or ceramic, to removed suspended and dissolved solids.

The additional filtration system may also include systems for measuring and adjusting the pH level of the effluent. This system may be as simple as a pH monitor and a concentrated acid and concentrated base source used to achieve the desired pH levels of the effluent. The additional filtration system may also use chemical or electrolytic precipitants that cause undesirable chemicals to drop out of solution in the effluent as a precipitate for easy removal. The system may additionally use electrolytic converters. These and other methods, as is known to those skilled in the art, may be used to achieve the required level of purity and pH levels in the effluent for use in the wet emissions reduction system.

After filtration, the effluent then passes through the filtered AWTS clean effluent pipe 110 to the secondary sensor, secondary pump, and secondary control system 50. The secondary sensor 50 recheck the water to insure that the chemicals, solids, and pH levels mentioned above have been adjusted to a level that complies with the requirements set forth by the engine and/or wet emissions reduction system manufacturer.

If the secondary sensor 50 detects that the effluent does not yet meet the required level of purity, it is recycled via the rejected/recirculated filtered AWTS clean effluent pipe 130 through the primary sensor, primary pump, and primary control system 30 and the additional filtration system 40. The primary sensor 30 rechecks the effluent for chemical and solid content as well as pH level. The effluent is then re-filtered by the additional filtration system 40 and rechecked by the secondary sensor 50. In another embodiment, the effluent is recycled directly to the filtration system 40 for re-filtration, and then rechecked by the secondary sensor 50.

When the AWTS clean effluent has reached the necessary level of purity, it is termed filtered AWTS clean effluent. At this point, it is pumped via the AWTS filtered clean effluent pipe 110 into the wet emissions technology reserve tank 60 for storage. Because the filtered AWTS clean effluent is now of an acceptable purity, and has passed the checks done by the primary sensor and primary control system 30 and secondary sensor and secondary control system 50, the tertiary sensor, tertiary pump, and tertiary control system 70 only needs to insure the filtered AWTS clean effluent level in the wet emissions technology reserve tank 60 is adequate. If there is sufficient filtered AWTS clean effluent in the tank 60, it is sent via the filtered AWTS clean effluent pipe 110 to the wet emissions reduction system 80 for consumption in the engine 90.

If further redundancy is desired, the tertiary sensor 70 could be configured to recheck the chemical and solid content of the filtered AWTS clean effluent and send it back to the primary sensor, primary pump, and primary control system 30 or the additional filtration system 40 as necessary. The sensor may also be configured to provide alarms if filtered AWTS clean effluent levels are too high or too low. It may also be configured to monitor other parameters as part of a comprehensive system management package. The sensor may also be connected via electrical or fiber optic cabling 140, indicated by dotted lines in FIG. 1, as part of said comprehensive system management package.

Figure 2:
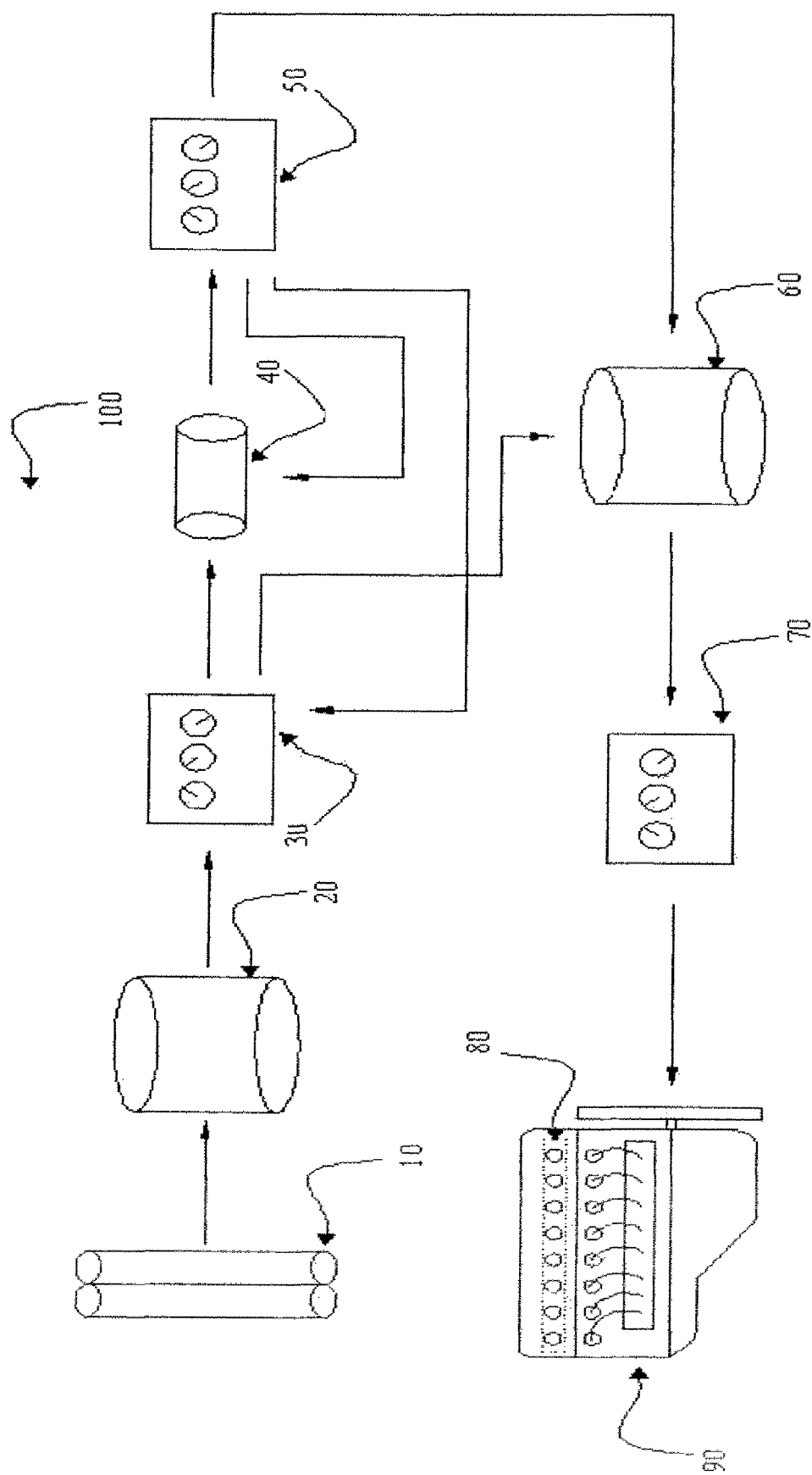
FIG. 2 is a block diagram of one specific embodiment of the wastewater emissions reduction system 100.

As shown in FIG. 2, a wastewater emissions reduction system 100 according to one embodiment of the present invention comprises, an AWTS clean effluent tank 20, which is associated with an AWTS 10, primary sensor, primary pump, and primary control system 30, an additional filtration system 40, secondary sensor, secondary pump, secondary control system 50, a wet emissions technology reserve tank 60, tertiary sensor, tertiary pump, and tertiary control system 70, a wet emissions reduction system 80, and a diesel engine 90.

Clean effluent from the AWTS is stored in the AWTS clean effluent tank 20. The present invention then further processes the AWTS clean effluent for use in a wet emissions reduction system. The AWTS clean effluent is pumped via the primary sensor, primary pump, and primary control system 30, where the primary sensor, in a specific embodiment, measures the level of chemical impurities, suspended solids, pH, etc. therein.

If the primary sensor, primary pump, and primary control system 30 detects that the AWTS clean effluent is pure enough for use in the wet emissions reduction system 80, the additional filtration system 40 and the secondary sensor, secondary pump, and secondary control system 50 are bypassed and the AWTS clean effluent is sent directly to the wet emissions technology reserve tank 60. Otherwise, the filtration system 40 adjusts the chemical levels in the AWTS clean effluent, filters out additional chemicals and solids, and adjusts pH as necessary. The filtered AWTS clean effluent then passes through the secondary sensor, secondary pump, and secondary control system 50. The secondary sensor 50 rechecks the filtered AWTS clean effluent to insure that the chemicals and solids mentioned above have been removed to a level that complies with the requirements set forth by the engine and/or wet emissions reduction system manufacturer.

If the secondary sensor 50 detect that the effluent does not yet meet the required level of purity, the rejected/recirculated filtered AWTS clean effluent is recycled through the primary sensor, primary pump, and primary control system 30 and the filtration system 40. The primary sensor 30 rechecks the effluent for chemical and solid content. The effluent is then re-filtered by the filtration system 40 and rechecked by the secondary sensor 50. In another embodiment, the effluent is recycled directly to the filtration system 40 for re-filtration, and then rechecked by the secondary sensor 50.

At this point, the filtered AWTS clean effluent is pumped into the wet emissions technology reserve tank 60 for storage. Because the AWTS clean effluent is now of an acceptable purity, and has passed the checks done by the primary sensor and primary control system 30 and the secondary sensor and secondary control system 50, the tertiary sensor, tertiary pump, and tertiary control system 70 only needs to insure the AWTS clean effluent level in the wet emissions technology reserve tank 60 is adequate. If there is sufficient filtered AWTS clean effluent in the tank, it is sent to the wet emissions reduction system 80 for consumption in the diesel engine 90.

The substitution of water for a calculated amount of fuel lowers the temperature in the combustion chamber as the water is converted to superheated steam. This reduction in combustion chamber temperature reduces the likelihood of detonation. This also results in a lower combustion temperature and significantly decreases the formation of NOx. The water is exhausted as water vapor and has no negative effects on the atmosphere.

Thus, the present invention, using any form of wet emissions reduction system, provides numerous advantages over known wastewater treatment systems and wet emissions reduction systems. This system is particularly useful for large vessels, e.g. cruise ships, military ships, ferries, etc., that produce large amounts of wastewater that may now be treated and used for emissions reductions rather than simply dumped overboard. Additionally, by lowering combustion chamber temperature, the formation of NOx in all conditions is significantly reduced.

The present invention also improves the longevity of the vessel's engines. The increased humidity in the combustion chambers may have a lubricating effect, thus reducing wear from friction. The presence of humidity in the combustion chamber also helps to reduce the occurrence of localized hot spots and lowers the overall temperature in the combustion chamber thus reducing thermal stress on the engine. Finally, the conversion of water vapor to superheated steam effectively prevents carbon buildup in the combustion chamber and in the exhaust system, the former being a major source of friction and hot spots in diesel engines. Reduction in carbon deposits can, in turn, reduce required maintenance, extend lubricating oil life, and make turbochargers and economizers more efficient.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method embodiments, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or embodied in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower ease is intended or required in instances where such broadening phrases may be absent. The use of the term "module" does not imply that the components or functionality described or embodied as part of the module are all configured in a common package. Indeed, any or all of the various components of a module, whether control logic or other components, can be combined in a single package or separately maintained and can further be distributed in multiple groupings or packages or across multiple locations.

While specific embodiments of the present invention have been described, other and further modifications and changes may be made without departing from the spirit of the invention. All further and other modifications and changes are included that come within the scope of the invention as set forth in the claims. The disclosures of all publications cited above are expressly incorporated by reference in their entireties to the same extent as if each were incorporated by reference individually.

I claim:

1. A system comprising:
   an AWTS clean effluent tank;
   a primary sensor, primary pump, and primary control system;
   an additional filtration system;
   a secondary sensor, secondary pump, and secondary control system;
   a wet emissions technology reserve tank; and
   a tertiary sensor, tertiary pump, and tertiary control system;
   wherein said system is adapted to be connected to a wet emissions reduction system on one or more diesel engines on a ship;
   wherein said AWTS clean effluent tank is connected via pipes that carry AWTS clean effluent from said AWTS clean effluent tank to said primary sensor, primary pump, and primary control system;
   wherein said primary sensor, primary pump, and primary control system is connected via pipes that carry AWTS clean effluent from the primary sensor, primary pump, and primary control system to said additional filtration system;
   wherein said primary sensor, primary pump, and primary control system is connected via pipes that carry AWTS clean effluent from the primary sensor, primary pump, and primary control system to said wet emissions technology reserve tank;
   wherein said additional filtration system is connected via pipes that carry filtered AWTS clean effluent from said additional filtration system to said secondary sensor, secondary pump, and secondary control system;
   wherein said secondary sensor, secondary pump, and secondary control system is connected via pipes that carry filtered AWTS clean effluent from said secondary sensor, secondary pump, and secondary control system to said wet emissions technology reserve tank;
   wherein said secondary sensor, secondary pump, and secondary control system is also connected via pipes that carry rejected/recirculated filtered AWTS clean effluent from said secondary sensor, secondary pump, and secondary control system to said primary sensor, primary pump, and primary control system;
   wherein said secondary sensor, secondary pump, and secondary control system is also connected via pipes that carry rejected/recirculated filtered AWTS clean effluent from said secondary sensor, secondary pump, and secondary control system to said additional filtration system;
   wherein said wet emissions technology reserve tank is connected via pipes that carry filtered AWTS clean effluent from said wet emissions technology reserve tank to said tertiary sensor, tertiary pump, and tertiary control system; and
   wherein said tertiary sensor, tertiary pump, and tertiary control system is connected via pipes that carry filtered AWTS clean effluent from said tertiary sensor, tertiary pump, and tertiary control system to said wet emissions reduction system.

2. The system of claim 1, wherein said additional filtration system comprises one or more filtration systems selected from the group consisting of filters, membranes, precipitants, pH adjusters, and electrolytic converters.

3. The system of claim 2, wherein the additional filtration system comprises, wherein said filters may comprise one or more filtration media selected from the group consisting of: charcoal, sand, clay, polymer, and paper.

4. The system of claim 2, wherein the additional filtration system comprises, wherein the membranes may comprise one or more membrane materials selected from the group consisting of stainless steel, polymer, and ceramic.

5. The system of claim 2, wherein the additional filtration system comprises, wherein said additional filtration system may comprise one or more precipitant systems selected from the group consisting of electrolytic precipitants and chemical precipitants.

6. A method comprising: utilizing the system of claim 1 to lower the combustion temperature of said diesel engine on said ship by introducing said filtered AWTS clean effluent from the system into the cylinder of said diesel engine.

7. A method comprising: utilizing the system of claim 1 to reduce the emissions of particulate matter of said diesel engine on said ship by introducing said filtered AWTS clean effluent from the system into the cylinder of said diesel engine.

8. The method of claim 6, wherein said lowering of combustion temperatures reduces the formation and emission of oxides of nitrogen.

9. The method of claim 6, wherein the filtered AWTS clean effluent is introduced into said cylinder of said diesel engine via a water injection system that injects said filtered AWTS clean effluent into the intake manifold of said diesel engine.

10. The method of claim 6, wherein said filtered AWTS clean effluent is introduced into said cylinder of said diesel engine via a water injection system that injects said filtered AWTS clean effluent directly into the cylinder of said diesel engine.

11. The method of claim 6, wherein said filtered AWTS clean effluent is introduced into said cylinder of said diesel engine by mixing said filtered AWTS clean effluent with diesel fuel in a fuel/water emulsion system.

12. The method of claim 7, wherein said filtered AWTS clean effluent is introduced into said cylinder of said diesel engine via a water injection system that injects said filtered AWTS clean effluent into the intake manifold of said diesel engine.

13. The method of claim 7, wherein the filtered AWTS clean effluent is introduced into said cylinder of said diesel engine via a water injection system that injects said filtered AWTS clean effluent directly into the cylinder of said diesel engine.

14. The method of claim 7, wherein said filtered AWTS clean effluent is introduced into said cylinder of said diesel engine by mixing said filtered AWTS clean effluent with diesel fuel in a fuel/water emulsion system.

* * * * *